(12) United States Patent
Hämmerle et al.

(10) Patent No.: US 8,800,324 B2
(45) Date of Patent: Aug. 12, 2014

(54) METHOD FOR PRODUCING A GLASS FIBER AND DEVICE

(75) Inventors: Wolfgang Hämmerle, Jena (DE); Lothar Brehm, Jena (DE); Matthias Auth, Essen (DE)

(73) Assignee: J-Fiber GmbH, Jena (DE)

( * ) Notice: Subject to any disclaimer, the term of this patent is extended or adjusted under 35 U.S.C. 154(b) by 160 days.

(21) Appl. No.: 13/319,463

(22) PCT Filed: May 17, 2010

(86) PCT No.: PCT/EP2010/056711
§ 371 (c)(1),
(2), (4) Date: Nov. 8, 2011

(87) PCT Pub. No.: WO2010/133537
PCT Pub. Date: Nov. 25, 2010

(65) Prior Publication Data
US 2012/0053043 A1     Mar. 1, 2012

(30) Foreign Application Priority Data

May 20, 2009   (DE) .......................... 10 2009 022 039

(51) Int. Cl.
C03B 37/07      (2006.01)
C03B 27/00      (2006.01)
C03B 37/025     (2006.01)
C03B 37/02      (2006.01)

(52) U.S. Cl.
USPC ............... 65/435; 65/384; 65/488; 65/351

(58) Field of Classification Search
USPC ........ 65/384, 401, 434, 435, 475, 488, 510, 65/513, 351
See application file for complete search history.

(56) References Cited

U.S. PATENT DOCUMENTS

| 6,565,775 | B2 * | 5/2003 | Dubois et al. ................ 264/1.24 |
| 2004/0033043 | A1 | 2/2004 | Monro et al. |
| 2005/0252248 | A1 * | 11/2005 | Kornreich et al. ............ 65/435 |
| 2005/0259932 | A1 | 11/2005 | Nagayama et al. |
| 2005/0281521 | A1 | 12/2005 | Oku et al. |
| 2006/0191293 | A1 | 8/2006 | Kuczma |
| 2007/0022786 | A1 * | 2/2007 | Foster et al. ................... 65/384 |

FOREIGN PATENT DOCUMENTS

| DE | 10 2006 012 869 | 10/2007 |
| JP | 59-227738 | 12/1984 |
| JP | 3-050134 | 3/1991 |
| JP | 8-217482 | 8/1996 |

(Continued)

OTHER PUBLICATIONS

Arai et al. "Photodarkening Phenomenon in Yb-Doped Fibers". *Fujikura Technical Review*, pp. 6-11 (2009).

*Primary Examiner* — Noah Wiese
(74) *Attorney, Agent, or Firm* — Hamre, Schumann, Mueller & Larson, P.C.

(57) ABSTRACT

A method for producing a glass fiber, through longitudinally drawing a preform in a drawing kiln, wherein cooling the glass fiber is performed in at least three time periods, wherein the glass fiber is exposed to a first time based cooling rate above a crystallization temperature range, to a second time based cooling rate that is greater than the first time based cooling rate within the crystallization temperature range, and to a third time based cooling rate which is smaller than the second time based cooling rate below the crystallization temperature range.

9 Claims, 5 Drawing Sheets

(56) References Cited

FOREIGN PATENT DOCUMENTS

| | | |
|---|---|---|
| JP | 2004-043231 | 2/2004 |
| JP | 2004-43231 | 2/2004 |
| JP | 2004-338972 | 12/2004 |
| JP | 2005-187285 | 7/2005 |
| JP | 2005-281090 | 10/2005 |
| JP | 2005-343703 | 12/2005 |

* cited by examiner

METHOD FOR PRODUCING A GLASS FIBER AND DEVICE

The invention relates to a method for producing a glass fiber according to claim 1, and it relates to a device for producing a glass fiber according to claim 9 and it relates to a glass fiber according to the preamble of claim 12.

Glass fibers are being widely used a light conducting fibers but also as resonators for generating laser light. For producing fibers of this type a glass fiber perform is heated in a drawing kiln and stretched through a drawing device into the shape of the glass fiber. The glass fiber is cooled subsequently, typically provided with a protective layer preferably made from a polymer and collected through a wind up device.

With increasing use of fibers of this type, however, the effect of a so called photo darkening occurs. This means disadvantageous interaction of light conducted within the fiber with structures within the micro structure of the fiber. This effect is partially a function of the wave length of the light coupled into the fiber. It causes an optical loss of light conduction in the fiber that increases over time and causes a decreasing power density of the laser light generated within an active laser fiber that is being used as a resonator. Photo darkening can be observed in particular in Yb-doted glass- or laser fibers. Thus, the absorption within the glass fiber material increases rapidly for high population inversions, wherein broad band absorption occurs in the material which grows like an avalanche. The laser light generated is therefore increasingly dampened and the quality of the resonator and thus the laser output power decreases significantly.

In order to reduce this optical effect several measures are known in the art. These are oriented towards influencing the inner structure of the glass fiber produced so that photo darkening starts as slowly as possible and only propagates slowly or comes to a standstill.

Thus the U.S. Patent application 2006/0191293 A1 and the Japanese documents JP 2005187285 AA and JP 2005 281090 AA respectively disclose production methods for a glass fiber in which an additional tempering zone is arranged after the drawing kiln. The method disclosed therein is based on the idea that mechanical tensions and inhomogenities are introduced into the glass fiber during the drawing process, wherein the tempering process is intended to remove them and heal them.

The Japanese printed document JP 20040433231 AA describes a manufacturing method for an optical glass, wherein tempering is performed at the preform before the drawing method begins, while the drawn glass fiber is subsequently cooled down slowly during a second tempering process arranged downstream. The method disclosed therein is based on the idea that the processes of photo darkening occur through inhomogenities and tensions within the preform as well as within the drawn fiber so that these have to be removed in a double tempering process.

More precise analyses of photo darkening, however, have proven that the described optical effects cannot be removed completely through the described tempering of the glass fiber or the preform, so that the quality of the drawn fiber is often not according to the specifications.

Thus, it is the object of the invention to provide a method for producing a glass fiber and a device for producing the glass fiber through which photo darkening can be reduced more effectively.

The object is achieved through a method with the features of claim 1 and through a device according to claim 9.

According to the invention the method for producing a glass fiber is performed through longitudinally pulling a preform in a drawing kiln, wherein a cooling of the glass fiber is provided in at least three time phases. Thus, the glass fiber is cooled above a crystallization temperature range with a first time based cooling rate, within the crystallization temperature range with a second time based cooling rate that is greater than the first time based cooling rate and below the crystallization temperature range with a third time based cooling rate that is smaller than the second time based cooling rate.

The recited method is based on the finding that photo darkening in particular in Ytterbium-doted laser fibers is also significantly influenced through crystallization processes, thus through at least partial transition of the amorphous glass structure into a crystalline configuration. Material changes of this type, however, can practically not be influenced through a mere tempering process. Thus, it is an object of the invention to configure the cooling of the glass fiber so that the temperature range in which crystallizations with a loss of amorphous glass structure occur within the fiber is passed very quickly so that only a minimum amount of time is provided for the crystallization process. The method is furthermore based on the finding that a healing of the glass defects generated during preform production or during forming a drawing onion is provided above and below the crystallization temperature range, thus when a pure glass phase is provided through a cooling that is as slow as possible in that a low cooling rate is provided. Thus, on the one hand side introducing tensions when drawing the glass fiber is minimized while a healing of possible remaining defects can be provided in the fiber below the crystallization temperature range.

In an advantageous embodiment the first time based cooling rate is achieved in that drawing the glass fiber is provided with a drawing velocity of less than 10 m per minute, preferably less that 5 m per minute even more preferably less than 2 m per minute. Thus, the fiber remains in a hot starting condition longer, wherein simultaneously existing tensions and thermally healable defects in the fiber are reduced and a formation of new tension and undesirable defects is avoided as far as possible.

Furthermore the first time based cooling range can be caused through an extended hot core zone arranged in the drawing kiln in another preferred embodiment. Thus it is prevented that the drawn fiber cools quickly into the crystallization temperature range. The cooling is rather delayed in a suitable manner.

The second time based cooling rate to be passed within the crystallization temperature range is caused in one embodiment through a cooling path arranged downstream of the drawing kiln. The cooling path causes a quick cooling and thus a quick passing through the crystallization temperature range. Thus, in other words the cooling rate of the fiber in this temperature range is very much higher than its crystallization rate so that the crystallization is effectively prevented in the fiber.

In one embodiment the third time based cooling rate is provided through a second kiln arranged subsequent to the drawing kiln and to the cooling path, wherein the second kiln maintains the core zone of the glass fiber at an entry temperature that is provided at the second kiln. Thus, the subsequently connected second kiln is not configured to heat up the glass fiber. Thus, it is only used to delay the temperature decrease after going through the second time based cooling rate and to stop the glass fiber at the intermediary temperature thus achieved, while preferably defects within the glass fiber heal during the last cooling process, but residual tensions within the glass fiber can also be removed.

As a supplement thereto, a coating process can be provided in an atmosphere with a reduced oxygen content while producing the preform and/or an irradiation in a spectral range between 170 nm and 12 μm can be provided at the preform and/or the glass fiber.

In a preferred embodiment the irradiation of the preform and/or of the glass fiber is provided through coupling the radiation into the light conducting path of the preform and/or of the glass fiber.

In the device a drawing kiln is provided with a core temperature above a crystallization range of a glass, a cooling path connected downstream of the drawing kiln with an intermediary temperature range disposed within the crystallization range of the glass and a tempering kiln arranged downstream of the cooling path, wherein the tempering kiln has a core temperature below the crystallization range.

The drawing kiln includes a drawing device for generating a drawing velocity of less than 5 m per minute. Furthermore a device for coupling ultra violet and/or infra red radiation into the light path of the preform and/or of the glass fiber is provided.

The method according to the invention is subsequently described in more detail based on preferred embodiments. Like numerals are being used for like components or method steps in the appended illustrated FIGS. 1-5 wherein.

Figure 1:
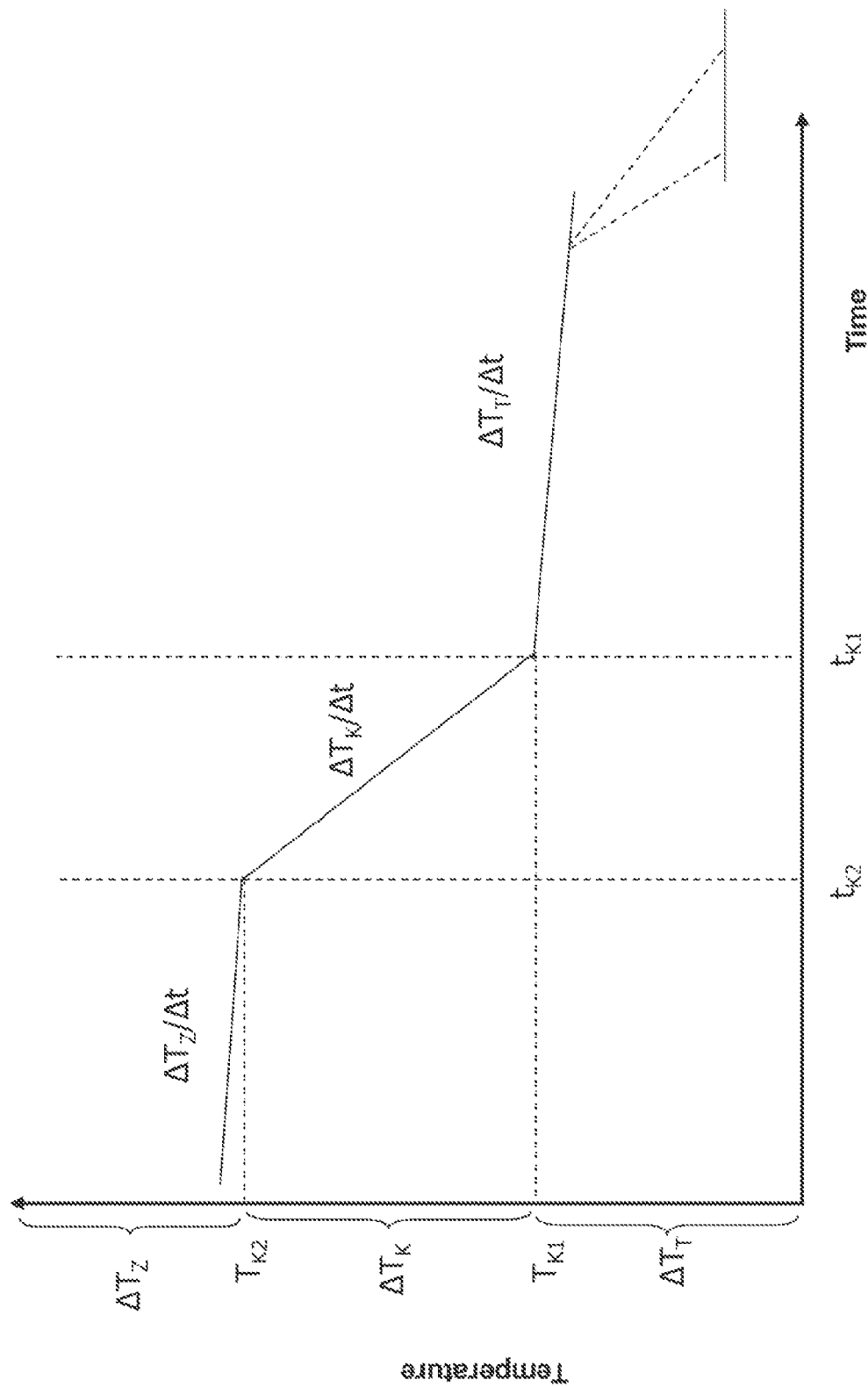
FIG. 1 illustrates an exemplary embodiment of the temperature condition during cooling of the glass fiber.

FIG. 1 illustrates an exemplary temperature distribution for performing the method. The method is performed within 3 temperature ranges. A first temperature range $T_Z$ includes the temperature range in which the glass fiber is drawn. This temperature range is implemented in a drawing kiln assembly.

The glass fiber runs through a crystallization range $T_k$ during further cooling. The crystallization range is characterized in that crystallization cores are formed with in this temperature range and crystallization occurs within the fiber core as a function of the dwelling time in this temperature range. The crystallization range is defined by a lower crystallization temperature $T_{K1}$ and an upper crystallization temperature $T_{K2}$.

Below the crystallization range $T_K$ there comes a temperature range $T_T$. Within this range there are no additional crystallization effects while the inhomogenities in the form of glass defects and possibly also process induced tensions in the fiber core can be healed. Typically values for $T_{K2}$ are at approximately 1500° C. and above while the lower crystallization temperature $T_{K1}$ is approximately 1150° C. and less. The parameters depend to a large extent from the glass matrix used and therefore have to be adapted accordingly to the respective glass by a person skilled in the art.

Within the recited temperature ranges, the glass fiber is subjected to 3 different cooling rates. The first cooling is performed within the temperature range $\Delta T_Z$ at a rather low cooling rate $\Delta T_Z/\Delta t$ because drawing the glass fiber is performed within a core zone of the drawing kiln in which there is almost constant temperature the cooling rate $\Delta T_Z/\Delta t$ is very low in this case. It only assumes a higher value when the drawn glass fiber leaves the core zone of the drawing kiln device. However, also outside of the core zone of the drawing kiln a lower cooling rate can be secured in that the dwelling time of the glass fiber within the drawing kiln arrangement is substantially extended.

A low cooling rate $\Delta T_Z/\Delta t$ is therefore achieved substantially in 2 ways. On the one hand side a drawing velocity of the glass fiber is drastically reduced. While the drawing methods known in the art prefer drawing velocities ≥ 10 m/min for producing special fibers, the drawing in the method described herein is performed at a drawing velocity of 0.5-1 m/min and is thus slowed to less than a tenth of the normal value. Thus, the cooling rate within the drawing device is accordingly low.

On the other hand side the hot core zone provided in the drawing device is configured so that its extension is substantially enlarged compared to the methods known in the art. Thus, the dwelling time of the drawn glass fiber in the drawing device is increased and the cooling rate of the glass fiber is additionally reduced.

Through the low cooling rate $\Delta T_Z/\Delta t$, in particular the significantly reduced drawing velocity and the long hot zone in the drawing device an efficient healing of precursor defects already provided in the preform is achieved, wherein the precursor defects partially cause the photo darkening. The charge separated conditions temporarily occurring during photo darkening as they are described by Arai et al. in Fujikura Technical Review 2009 can recombine particularly well without permanent structural change in the matrix through the low fault 3 dimensional grid structure in the glass matrix. This minimizes the photo darkening.

Contrary to the very low cooling rate $\Delta T_Z/\Delta t$ in the drawing kiln device the glass fiber passes through the crystallization range $\Delta T_k$ with a much lower cooling rate $\Delta T_k/\Delta t$. The quick cooling of the glass fiber prevents that the crystallization is limited as far as possible to few crystallization cores. The glass fiber is also cooled fast enough so that the crystallization range has already been passed through before the crystallization in the fiber has spread or has started. This is achieved in that the crystallization range of the glass fiber between an upper crystallization temperature $T_{K2}$ and a lower crystallization temperature $T_{K1}$ is passed through quickly. Thus, a time period between a point in time $t_{K2}$ at which the fiber has the temperature $T_{K2}$ and a point in time $t_{K1}$ at which the fiber has reached the temperature $T_{K1}$ is kept as short as possible.

Below the lower crystallization temperature $T_{K1}$ in the temperature range $T_T$ the cooling of the glass fiber is continued with a lower cooling rate $\Delta T_T/\Delta t$. For this an additional heating path, in particular a tempering kiln is provided. The glass fiber reaches its hot zone when its temperature has dropped below the lower crystallization temperature $T_{K1}$. The fiber is not heated anymore in the tempering kiln, but is kept at its entry temperature for a long as possible. During the tempering section glass defects that still exist and which contribute to the photo darkening behavior are healed further.

Figure 2:
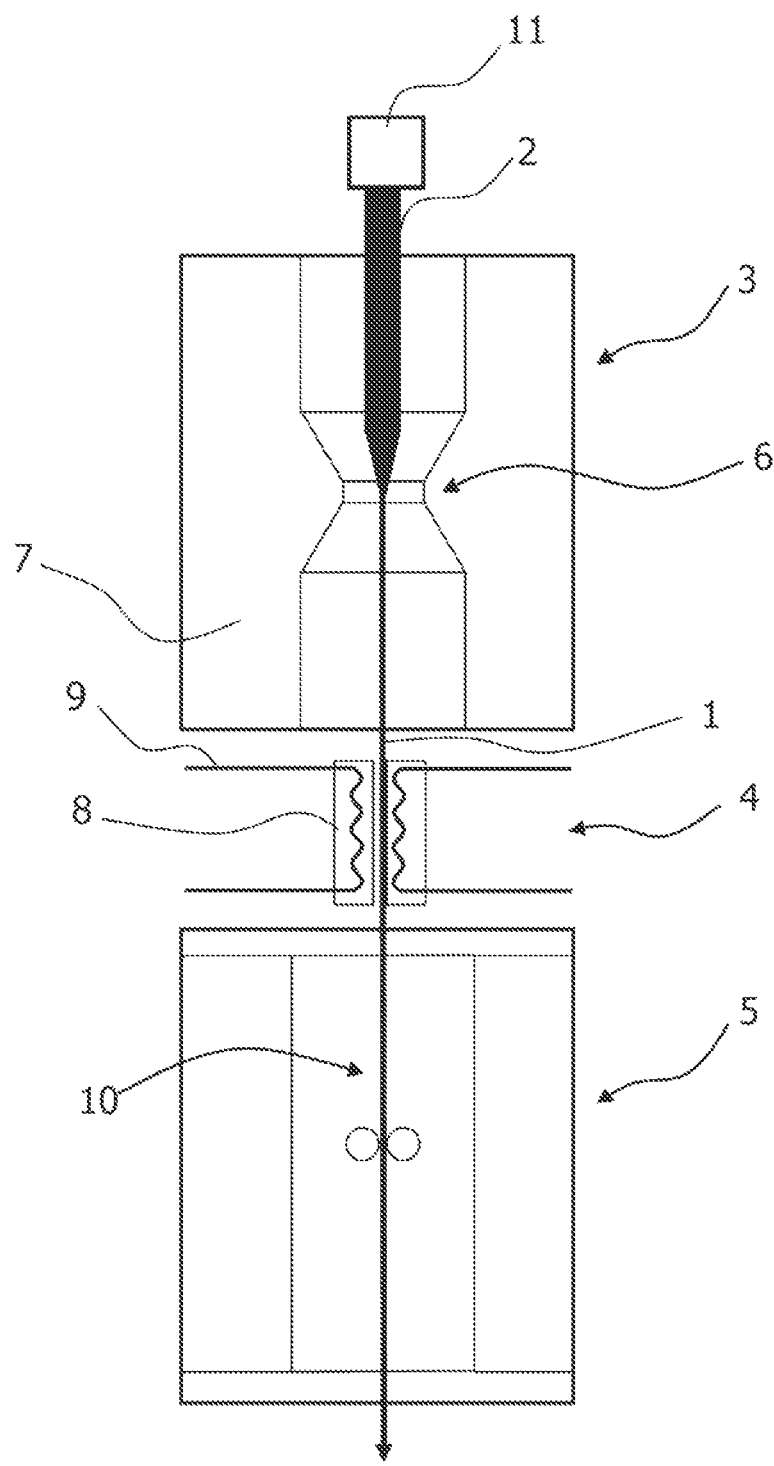
FIG. 2 illustrates an exemplary embodiment of a device for performing the method and for implementing the temperature curve illustrated in FIG. 1.

FIG. 2 illustrates an exemplary device for performing the method. The device is used for producing a glass fiber 1, wherein a preform is used as base material. The preform is drawn in a drawing kiln 3 to form the glass fiber. A cooling path 4 is connected after the drawing kiln. A tempering kiln 5 is arranged after the drawing kiln. According to the preceding embodiments a temperature above the crystallization range of the glass fiber is provided in the drawing kiln. The cooling path cools the glass fiber with a high cooling rate from the upper crystallization temperature to the lower crystallization temperature. The tempering kiln takes over the glass fiber thus cooled and maintains it at a temperature value slightly below the lower crystallization temperature.

In order to implement the lowest possible cooling rate the drawing unit includes a drawing device which is configured for a low drawing velocity. Thus, the drawing velocity is set to a value which is set at the most to one tenth of the typical value that is set for a drawing process of this type. Thus, the dwelling time of the pulled glass fiber in the drawing kiln is maximized. Furthermore the drawing kiln includes an arrangement of suitably configured and positioned graphite elements 7 which extend the hot core zone of the drawing kiln and which maintain the hot core zone also beyond the actual drawing portion in the kiln.

The drawing path 4 includes an arrangement of cooling elements 8 which are either loaded with a cooling medium 9 or which transfer the heat emitted by the glass fiber effectively to the environment through a lamellar assembly. For a cooling rate of the glass fiber that is as high as possible with a temperature drop of 200 K in a time frame of a few seconds the difference between the glass fiber temperature and the ambient atmosphere has to be as high as possible. The ambient atmosphere is therefore cooled to the temperature value that is as low as possible e.g. to a temperature of 10° C.-0° C. The cooling elements are therefore configured e.g. as evaporators in a cooling cycle. Alternatively thereto the cooling elements can be configured as a blower in which adiabatically expended and accordingly cold gas, in particular carbon dioxide is conducted onto the glass fiber. Cooling elements are also feasible in which the glass fiber is sprayed with a liquid medium evaporating on the glass fiber surface without residual. Furthermore cold preferably finely fogged water or finely fogged liquid nitrogen or another cooling medium are feasible.

The tempering kiln 5 connected downstream of the cooling path 4 is adjusted to the temperature of the glass fiber that the glass fiber has assumed at the end of the cooling path. Thus, the glass fiber enters the core portion of the tempering kiln without additional cooling or heating being performed.

Furthermore a coupling device 11 is provided through which electromagnetic radiation in a spectral range between 170 nm and 12 µm can be coupled into the preform 2 and thus also into the glass fiber 1.

Figure 3:
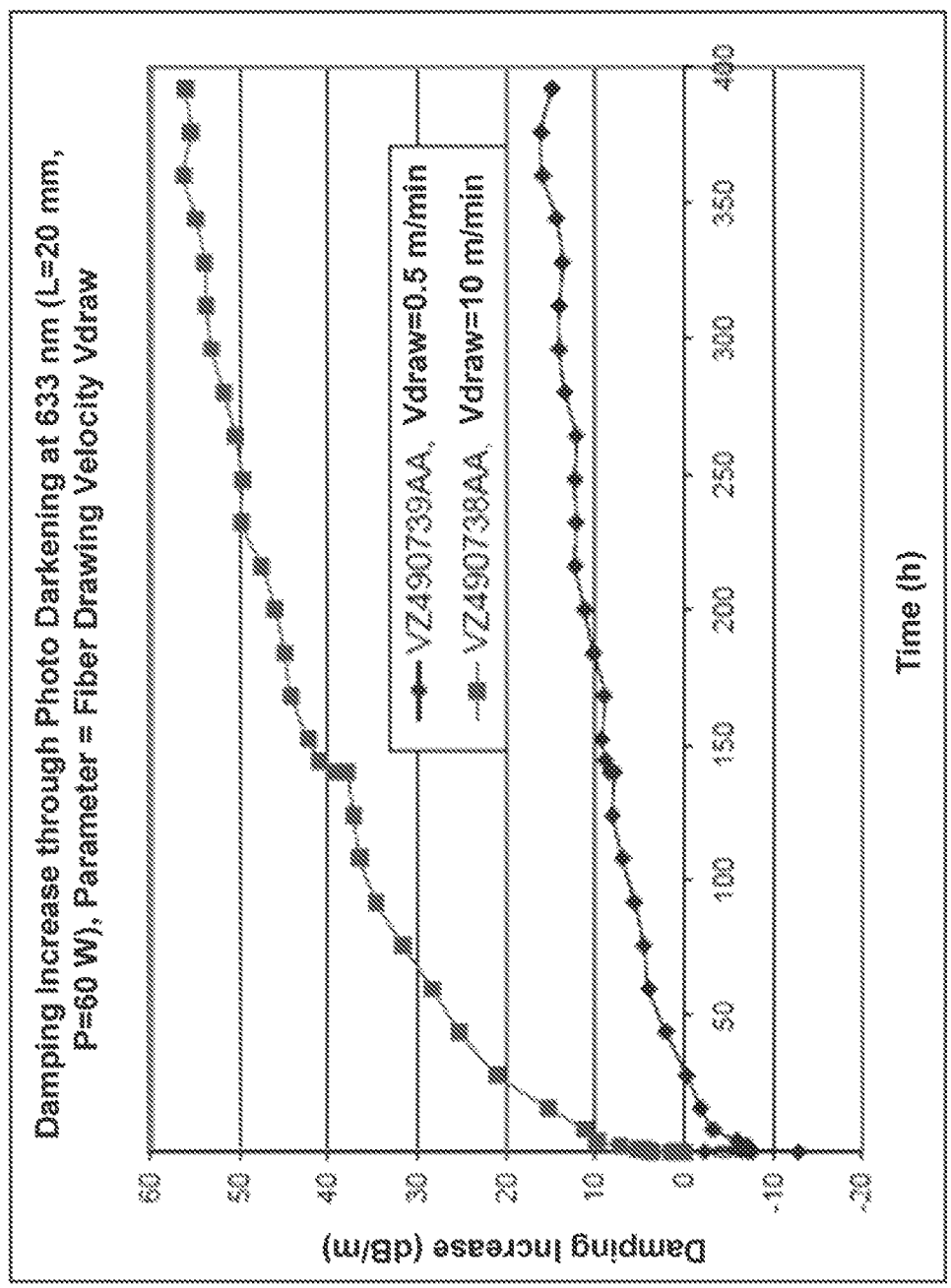
FIG. 3 illustrates photo darkening on a time basis as a function of different drawing velocities of the glass fiber.

Based on an example FIG. 3 illustrates the influence of various fiber draw velocities upon the photo darkening. The diagram illustrated in the figure points at a damping increase in dB/m with reference to a length unit of the fiber as a function of time, this means of the service life of the fiber at a wave length of the coupled in light of 633 nm. The curve illustrated as a sequence of squares represents the photo darkening of a glass fiber which has been drawn with a fiber drawing velocity of 10 m/min, thus accordingly quickly. The diagram illustrates a very quick increase of the photo darkening for the fast drawn glass fiber. The damping increase is approximately 15-20 dB/m already during the first 10 operating hours and approaches a final value of approximately 55 dB/m at approximately 400 operating hours.

In a comparison thereto the diagram illustrates the time based curve of the photo darkening for a glass fiber which has been drawn at a velocity of 0.5 m/min. The damping increases much more slowly compared to the quickly drawn glass fiber. The final value reached after approximately 400 service hours is only approximately 15 dB/m and is thus approximately 4 times lower.

Figure 4:
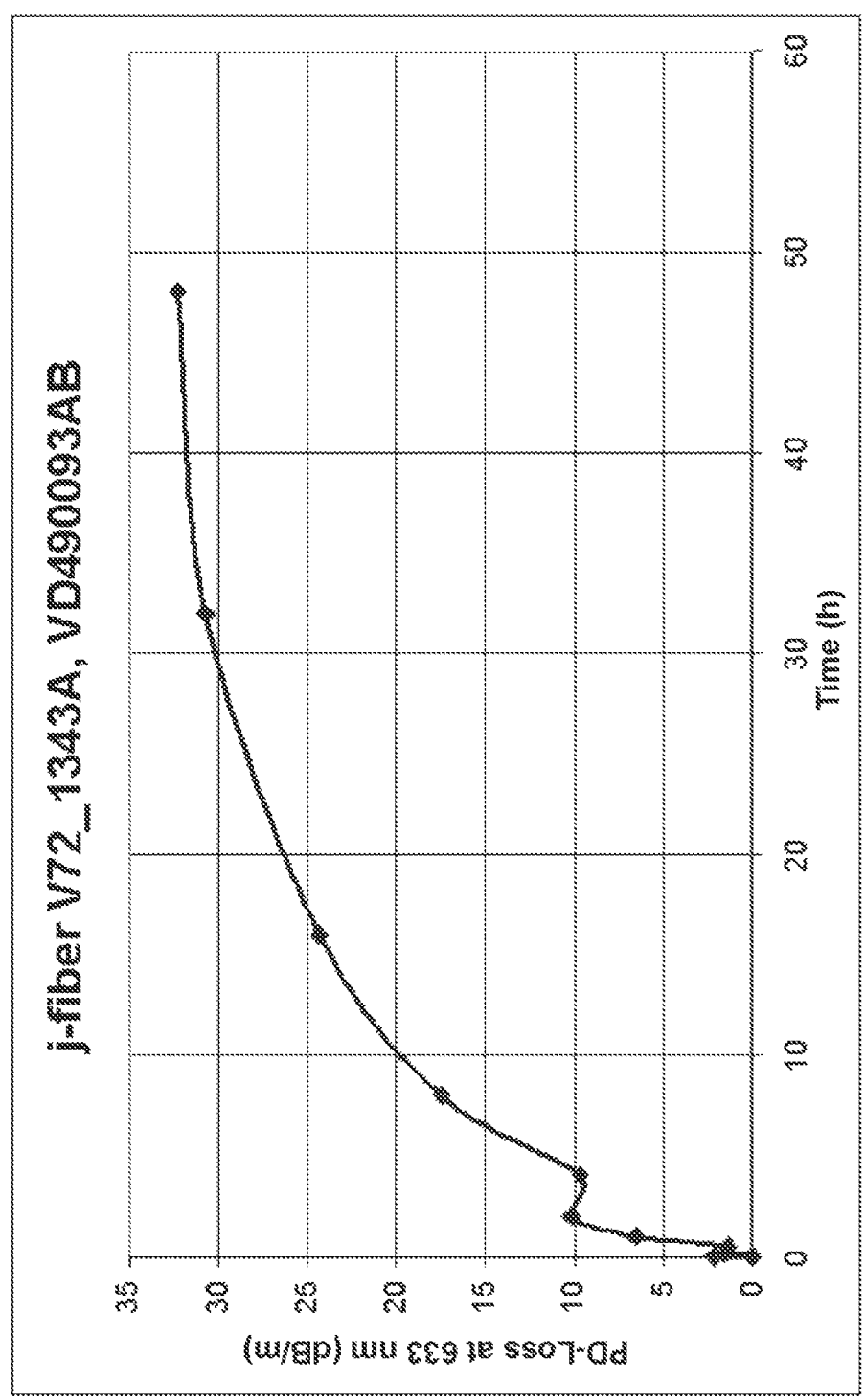
FIG. 4 illustrates the photo darkening on a time basis for a wave length of 633 nm.

FIG. 4 illustrates the time based damping properties of another embodiment at a first higher drawing velocity. For production a preform is being used which includes a P2O5-Al2O3-Yb2O3-doting in the core portion. The preform was drawn after jacketing and grinding a double-D. The drawing velocity was 10 m/min the pull off force was approximately 180 cN. This generated a circumscribed circle diameter of approximately 450 µm and an inner circle diameter of approximately 400 µm. A core diameter of approximately 20 µm was reached.

The photo darkening losses at 633 nm for this glass fiber were approximately 33 dB/m after approximately 48 hours.

Figure 5:
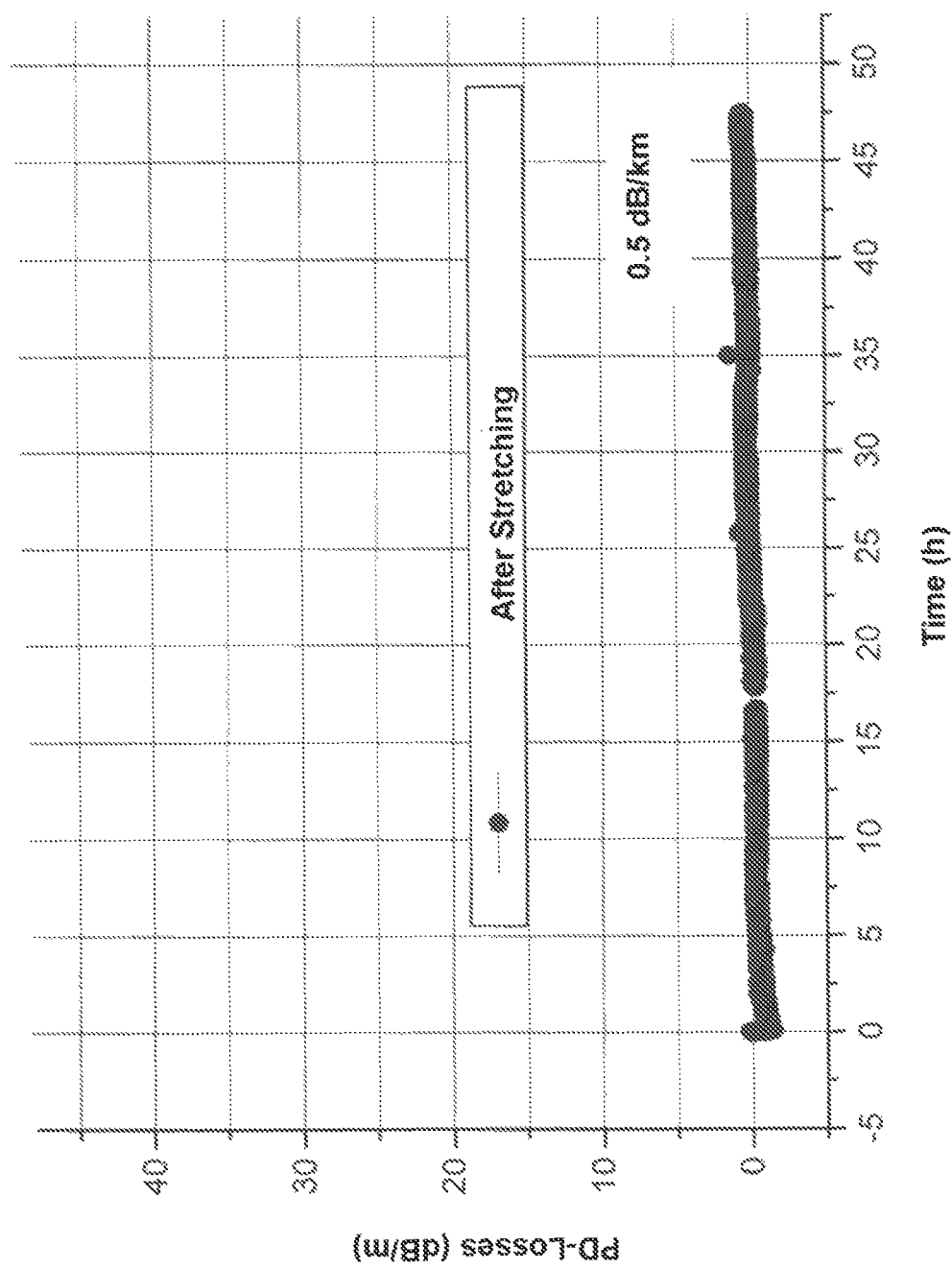
FIG. 5 illustrates another time based curve for a drastically reduced photo darkening.

FIG. 5 illustrates an embodiment for another fiber with the same fiber pull of FIG. 4 which has been stretched on a taper stretching device with a lower velocity. In the taper stretching device the base fiber was clamped and locally partially heated through irradiation with a $CO_2$ laser up to the softening temperature of approximately 1400-1600° C. The locally heated fiber was subsequently stretched at a low feed- and pull off velocity to the predetermined fiber diameter. The pull off velocity for the fiber was in a range of approximately 10 cm per minute. This value is by approximately two magnitudes smaller than the original fiber pulling velocity of 10 m/min. Through the small stretching velocity the stretched fiber is cooled significantly slower.

The measured photo darkening losses at the stretched fiber are approximately 0.5 dB/m for 633 nm and for a measuring time of approximately 48 hours. FIG. 5 illustrates the values thus determined in a chart. The determined values for the photo darkening losses are reduced by a factor of approx. 60-70 compared to the values determined for the fast drawn fiber. The extremely different drawing conditions for fiber drawing at 10 m/min and stretching at 10 c/min can be considered causes for the extreme improvement of the photo darkening properties of the fibers.

Thus, the chemical properties of the active core of the fiber are not limited to the components recited in the embodiments. Thus, the laser irradiation can also be provided through other laser transitions than those of Ytterbium. So called f-elements of the group of lanthanides or rare earths like e.g. neodym are also especially well suited. For other laser fibers the glass or duster matrix stabilizing the laser medium has to be adapted so that the temporarily induced charge separated conditions induced through the effect of pumping radiation which causes the photo darkening recombine or relax as quickly as possible. This can be provided through a different stoichiometry of the matrix forming elements or by using other or additional element compounds which besides forming a stable glass matrix also perform as a charge quencher. For ytterbium doted fiber lasers a component matrix including substantially aluminum oxide, silicone oxide, phosphorus oxide or hydrogen in a suitable stoichiometry has proven particularly useful.

This method according to the invention was described based on preferred embodiments. Additional embodiments are known to persons skilled in the art. These embodiments can be derived in particular from the dependent claims.

REFERENCE NUMERALS AND DESIGNATIONS $\Delta T_K$ crystallization range
$T_{K1}$ lower crystallization temperature
$T_{K2}$ upper crystallization temperature
$\Delta T_T$ tempering range
$\Delta T_Z$ drawing temperature range
$T_K/\Delta t$ cooling rate in crystallization range
$\Delta T_T/\Delta t$ cooling rate in tempering range
$\Delta T_Z/\Delta t$ cooling range in drawing temperature range
1 glass fiber
2 preform
3 drawing kiln
4 cooling path
5 tempering kiln
6 drawing device 7 graphite elements
8 cooling element
9 cooling medium
10 transport device
11 coupling device

The invention claimed is:

1. A method for producing a glass fiber, through longitudinally drawing a preform in a drawing kiln, wherein cooling the glass fiber is performed in at least three time periods, wherein the glass fiber is exposed to a first time based cooling rate ($\Delta T_Z/\Delta t$) above a crystallization temperature range ($\Delta T_K$), to a second time based cooling rate ($\Delta T_K/\Delta t$) that is greater than the first time based cooling rate within the crystallization temperature range, and to a third time based cooling rate ($\Delta T_T/\Delta t$) which is smaller than the second time based cooling rate below the crystallization temperature range, wherein the first time based cooling rate ($\Delta T_Z/\Delta t$) is caused by a drawing velocity of less than 10 m/min.

2. The method according to claim 1, wherein the first time based cooling rate ($\Delta T_Z/\Delta t$) is caused by the drawing velocity of less than 5 m/min.

3. The method according to claim 1, wherein the first time based cooling rate ($\Delta T_Z/\Delta t$) is performed within an extended hot core zone that is arranged in the drawing kiln.

4. The method according to claim 1, wherein the second time based cooling rate ($\Delta T_K/\Delta t$) is caused by a cooling path arranged downstream of the drawing kiln.

5. A method for producing a glass fiber, through longitudinally drawing a preform in a drawing kiln, wherein cooling the glass fiber is performed in at least three time periods, wherein the glass fiber is exposed to a first time based cooling rate ($\Delta T_Z/\Delta t$) above a crystallization temperature range ($\Delta T_K$), to a second time based cooling rate ($\Delta T_K/\Delta t$) that is greater than the first time based cooling rate within the crystallization temperature range, and to a third time based cooling rate ($\Delta T_T/\Delta t$) which is smaller than the second time based cooling rate below the crystallization temperature range, wherein the third time based cooling rate ($T_T/\Delta T$) is caused by a second kiln device arranged downstream of the drawing kiln and/or the cooling path, wherein the second kiln device maintains an entry temperature ($T_{K1}$) within a core zone of the glass fiber, wherein the entry temperature ($T_{K1}$) is provided at the second kiln device.

6. The method according to claim 1, wherein a coating process in an atmosphere with reduced oxygen content is provided for producing the preform.

7. A method for producing a glass fiber, through longitudinally drawing a preform in a drawing kiln, wherein cooling the glass fiber is performed in at least three time periods, wherein the glass fiber is exposed to a first time based cooling rate ($\Delta T_Z/\Delta t$) above a crystallization temperature range ($\Delta T_K$), to a second time based cooling rate ($\Delta T_K/\Delta t$) that is greater than the first time based cooling rate within the crystallization temperature range, and to a third time based cooling rate ($\Delta T_T/\Delta t$) which is smaller than the second time based cooling rate below the crystallization temperature range, wherein an irradiation with a spectral range between 170 nm and 12 μm is provided at the preform and/or the glass fiber.

8. The method according to claim 7, wherein the irradiation of the preform and/or of the glass fiber is provided through coupling the radiation into the light conductive path of the preform and/or of the glass fiber.

9. The method according to claim 1, wherein the first time based cooling rate ($\Delta T_Z/\Delta t$) is caused by the drawing velocity of less than 2 m/min.

* * * * *